July 14, 1959 R. K. POTTER 2,894,798

MAGNETIC PRINTER

Filed Jan. 27, 1956 2 Sheets-Sheet 1

INVENTOR
R. K. POTTER
BY Harry C. Hart
ATTORNEY

July 14, 1959 R. K. POTTER 2,894,798

MAGNETIC PRINTER

Filed Jan. 27, 1956 2 Sheets-Sheet 2

INVENTOR
R. K. POTTER
BY Harry C. Hart
ATTORNEY 2,894,798

MAGNETIC PRINTER

Ralph K. Potter, Brookside, N.J., assignor to Bell Telephone Laboratories, Incorporated, New York, N.Y., a corporation of New York Application January 27, 1956, Serial No. 561,887

4 Claims. (Cl. 346—74)

Figure 1:
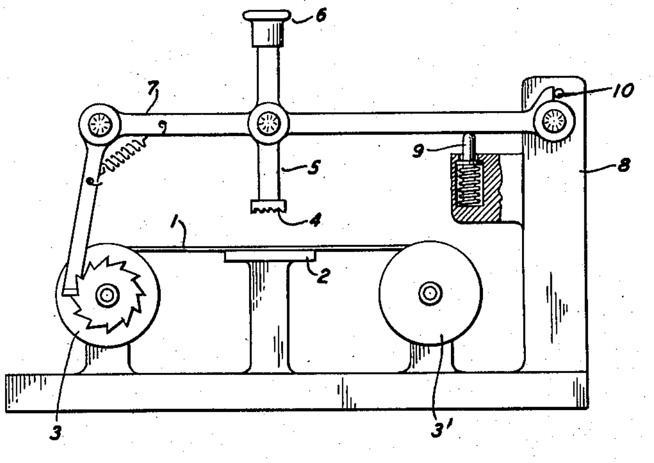

This invention relates to magnetic printing. More particularly it relates to a method of and apparatus for printing on a magnetic medium discrete magnetic flux patterns of cooperative magnetic flux fields each representing one or more bits of information.

In the expanding field of mechanical data processing devices the language of literature gives place to a new language of codes adapted to the peculiar sensory systems of the machines rather than those of human beings. Transmission of the information which is the work product of these machines becomes cumbersome indeed if that transmission be prejudiced by translation from machine language and back again. Accordingly it becomes essential that means be provided to record in suitable form for transmission the coded language of the machine.

It is well established that a magnetic recording medium, for example, a magnetic tape, is an excellent vehicle for such recording. In accordance with a principal feature of this invention, a means is provided for printing discrete bits of coded information on such a magnetic recording medium by bringing into magnetizing proximity with that medium a magnetic head, comparable to the familiar typewriter key, upon which head a permanently magnetized space pattern is established.

In the past magnetic information has been printed on a magnetic medium by passing that medium through a suitably formed gap in a ferromagnetic armature which armature has been magnetically energized by passage of electric current through a suitably disposed coil. This method of magnetic printing, while successful, nonetheless lay open to several objections. Passage of the recording medium through a gap in an armature necessitated that magnetic impressions recorded on that medium be represented by a magnetic polarization substantially perpendicular to the magnetic recording surface. Experience has shown such transverse magnetic impressions to be inferior in reproduction efficiency to a magnetic pattern lying substantially in the plane of the magnetic recording medium. And further, the required magnetizing coils, core structure, and power supplies render a device to effect such printing both cumbersome and lacking in flexibility.

Accordingly it is a first object of this invention to provide a simple and flexible method of and means for magnetic printing. And another object of this invention is to provide means for printing a magnetic pattern lying in the plane of the recording medium surface.

In accordance with the present invention these and other objects are achieved with a magnetic printing apparatus in which a plurality of magnets or magnetically polarized regions are disposed in a space-coded pattern in a mutually influencing relation within a plane substantially parallel to a surface of a record printing head. This head is mounted to be brought into magnetizing relation with a magnetizable medium.

Figure 2:
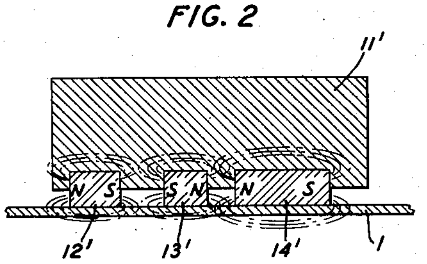
Figure 3:
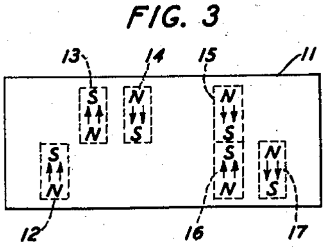
Figure 4:
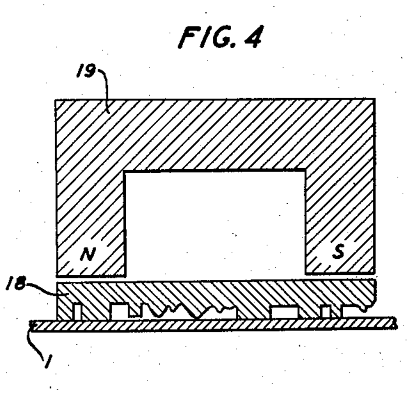
Figure 5:
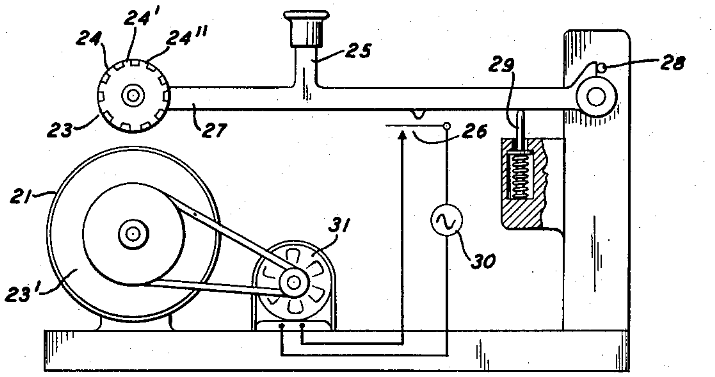
Figure 6:
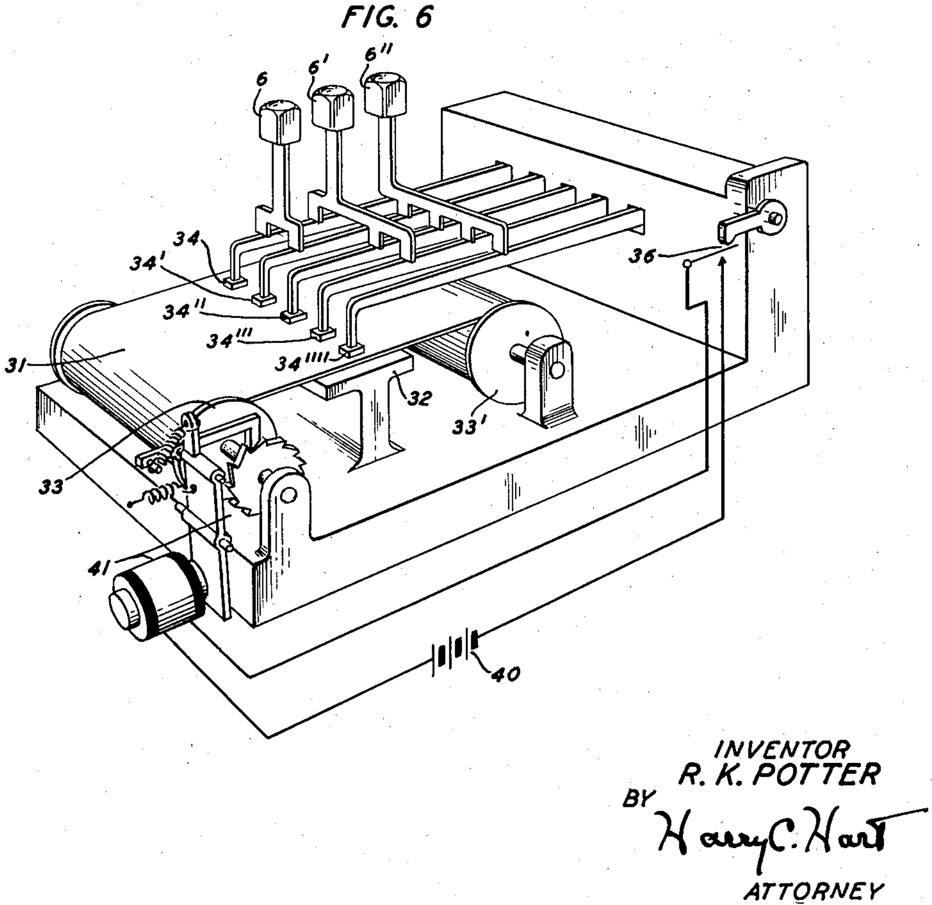

The invention will be more clear and other objects, features, and advantages thereof will be apparent from the following brief description of illustrative embodiments of the invention taken together with the drawings in which:

Fig. 1 represents a simple apparatus for applying a permanently magnetized space pattern to a magnetic tape;

Figs. 2, 3, and 4 represent alternative forms of a magnetic printing head in which the space pattern of Fig. 1 may be established;

Fig. 5 shows an apparatus for magnetic printing by rolling, as opposed to stationary, magnetic contact; and Fig. 6 shows a machine adapted to utilize the flexibility and simplicity of the invention in the printing of widely diversified magnetic information.

Looking in more detail to the drawings, Fig. 1 shows a simple apparatus for magnetic printing. A magnetic tape 1, rolled on the two drums 3 and 3', passes over a backing surface 2. A magnetic recording head 4, on which is impressed an appropriate space pattern, is fixed to one end of an operating shaft 5. A designating cap 6 is affixed to the other end of this shaft 5. A suitable ratchet drive linkage 7 rests on a spring loaded pin 9 and is connected to an appropriate supporting structure 8, the shaft 5 and the tape-reeling drum 3. Counter-clockwise rotation of the linkage 7 is limited by a pin 10. Manual actuation of the shaft 5 by pressure on the designating cap 6 imparts motion to the tape 1 by the familiar ratchet operation until the magnetic recording head 4 comes into magnetizing proximity with the tape 1. In this instant the tape 1 remains stationary and the magnetic space pattern established on the bottom surface of that head 4 is printed on the tape 1.

The magnetic pattern impressed on such a recording head may be established in several forms. The recording head, shown in the side view of Fig. 2 in magnetizing relation with the recording medium 1, may comprise a suitable supporting structure 11' in the bottom surface of which are embedded a plurality of minute magnets 12', 13', 14' suitably placed in coded arrangement. An alternative form which such a recording head may take is shown in plan view in Fig. 3. Here a block 11 of highly retentive magnetic material, for example, the alloy known as "Alnico," has impressed on a surface six discrete regions 12, 13, 14, 15, 16, 17 of magnetic polarization.

In this latter type of arrangement, a large number of permutations of magnetic codes may be established on a single head. The patterns may be coded in terms of spatial disposition on the block surface from top to bottom and from left to right; they may be coded in terms of their spatial orientation in either of these two dimensions; they may be coded in terms of the magnetic polarization, from north to south, of the individual magnetized areas.

Still another form which the recording head may take is shown in side view in Fig. 4. Here an armature 18 of moderate magnetic permeability is shown in contact with a recording medium 1. The lower surface of the armature 18 is serrated in accordance with the magnetic pattern to be printed on the medium. A permanent magnet 19 provides a magnetizing force such that the serrations of the armature 18 acquire a magnetic significance. This significance is expressed magnetically by the leakage flux flowing through the medium 1 in varying intensities between the raised portions of the lower surface of the armature 18.

In each of the above three magnetic heads it is observed that the magnetic field emanating therefrom lies in a plane substantially parallel to the recording surface. Thus all three are able to achieve the objective of recording a magnetic signal in the plane of the recording medium surface rather than transverse thereto.

Turning now to Fig. 5, a form of the invention alternative to that shown in Fig. 1 is seen. Magnetic heads 24, 24', 24'' . . . such as those discussed in consideration of Figs. 2, 3, and 4 are arranged circumferentially about the cylindrical surface of a drum 23. This drum 23 is supported by a spring loaded pin 29 in separation from a companion drum 23', the surface of which latter drum 23' is coated with a magnetic recording medium 21. The magnitude of this separation is limited by the action of a pin 28 on a drum supporting arm 27. Manual pressure on the shaft 25 serves to depress the supporting arm 27 against the spring-loaded pin 29 to bring the upper drum 23 into magnetizing contact with the lower record drum 23'. Depressing the arm 27 closes a contact 26 which supplies current from a source 30 to a belt drive motor 31 to cause rotation of the lower record drum 23'. Frictional forces between the two drums 23 and 23' cause the upper drum 23 to rotate at the same peripheral speed as its companion 23'. Thus rolling contact of the successive magnetic patterns on the upper drum 23 with the magnetically sensitive surface of the lower drum 23' prints magnetic impressions on that surface. And this printing, manually controlled through the shaft 25, may repetitively record, in the fashion of the well known rotary printing press, the entire group of patterns appearing on the surface of the drum 23 or may selectively record separate groups of patterns from among those established on the magnetic heads 24, 24' and 24'' . . . .

Next, Fig. 6 shows a magnetic printing apparatus having a plurality of recording heads 34, 34', 34'' . . ., each of which may be one of the recording heads shown in Figs. 2, 3 and 4. Actuation of individual ones of the printing selectors 6, 6', 6'' . . . causes respectively a different permutation of the five recording heads 34, 34', 34'' . . . to depress and come into magnetizing contact with a magnetic recording medium 31 shown wound about two drums 33 and 33' and passing over the backing platen 32. Depression of any one of the operating buttons, 6, 6', 6'' . . . by a suitable linkage operates the key contactor 36 which, in turn, supplies actuating current to position the solenoid-operated pawl-ratchet mechanism 41, from the battery 40 to advance the medium 31 after recording contact has been made. In this embodiment is seen the ready adaptability of the invention to a recording machine suitable for facile operation whatever the complexity of the magnetic code to be recorded.

These embodiments are in no wise to be considered as limiting the scope of the invention nor the breadth of the claims which define it. Rather these embodiments are illustrative only of principal features of the invention and indicative too of the extent of its application.

Reference is hereby made to a related application of applicant R. K. Potter, Serial No. 556,199, filed December 29, 1955.

What is claimed is:

1. In apparatus for magnetic recording, the combination which comprises a rigid body having on a surface thereof discrete magnetic regions polarized at different magnetic intensity levels and disposed in mutually influencing coded arrangement comprising a magnetic space pattern of plural magnetic flux fields substantially parallel to said surface, a recording medium having a magnetizable surface, means operable to bring said first-named surface into proximity with an area of said magnetizable surface, thereby to print a magnetic record of said discrete regions on said magnetizable surface, and means for presenting a different area of said magnetizable surface to said rigid body for each successive operation of said first named means.

2. Apparatus as set forth in claim 1, wherein said rigid body comprises a surface having space-coded regions of differing magnetic permeability and permanent magnet means for establishing a magnetomotive potential along said surface.

3. Apparatus as set forth in claim 1 wherein said rigid body comprises a plurality of permanent magnets, said magnets being disposed in a space-coded arrangement on a surface of said body.

4. In apparatus for magnetic recording, the combination which comprises a rigid body having on a substantially planar surface thereof more than two discrete magnetic regions polarized at differing magnetic intensity levels and disposed in mutually influencing space-coded arrangement, whereby said regions in excess of two in number comprise a space-coded and an intensity-coded pattern of interacting magnetic flux fields substantially parallel to said planar surface, a recording medium having a substantially planar magnetizable surface, means operable to bring said first-named surface into magnetizing proximity with an area of said recording surface, thereby to print a magnetic record of said dually coded space patterns on said magnetizable record surface and means for presenting a different area of said magnetizable surface to said rigid body for each successive operation of said first-named means.

References Cited in the file of this patent

UNITED STATES PATENTS

| | | |
|---|---|---|
| 2,504,997 | Mason | Apr. 25, 1950 |
| 2,511,121 | Murphy | June 13, 1950 |
| 2,558,187 | Marrison | June 26, 1951 |
| 2,560,474 | Potts | July 10, 1951 |
| 2,561,476 | Lang | July 24, 1951 |
| 2,734,948 | Mueller | Feb. 14, 1956 |
| 2,743,988 | Allyn | May 1, 1956 |
| 2,751,433 | Linger | June 19, 1956 |
| 2,763,204 | Sims | Sept. 18, 1956 |
| 2,791,310 | Jones | May 7, 1957 |